April 3, 1934.  J. A. HOLLANDER  1,953,230
SPEED CONTROL MEANS FOR METAL FORMING MACHINES AND THE LIKE
Filed Aug. 24, 1931  4 Sheets-Sheet 1

BEST AVAILABLE COPY

Inventor;
Jacob A. Hollander;
By: Carl S. Lloyd
Atty.

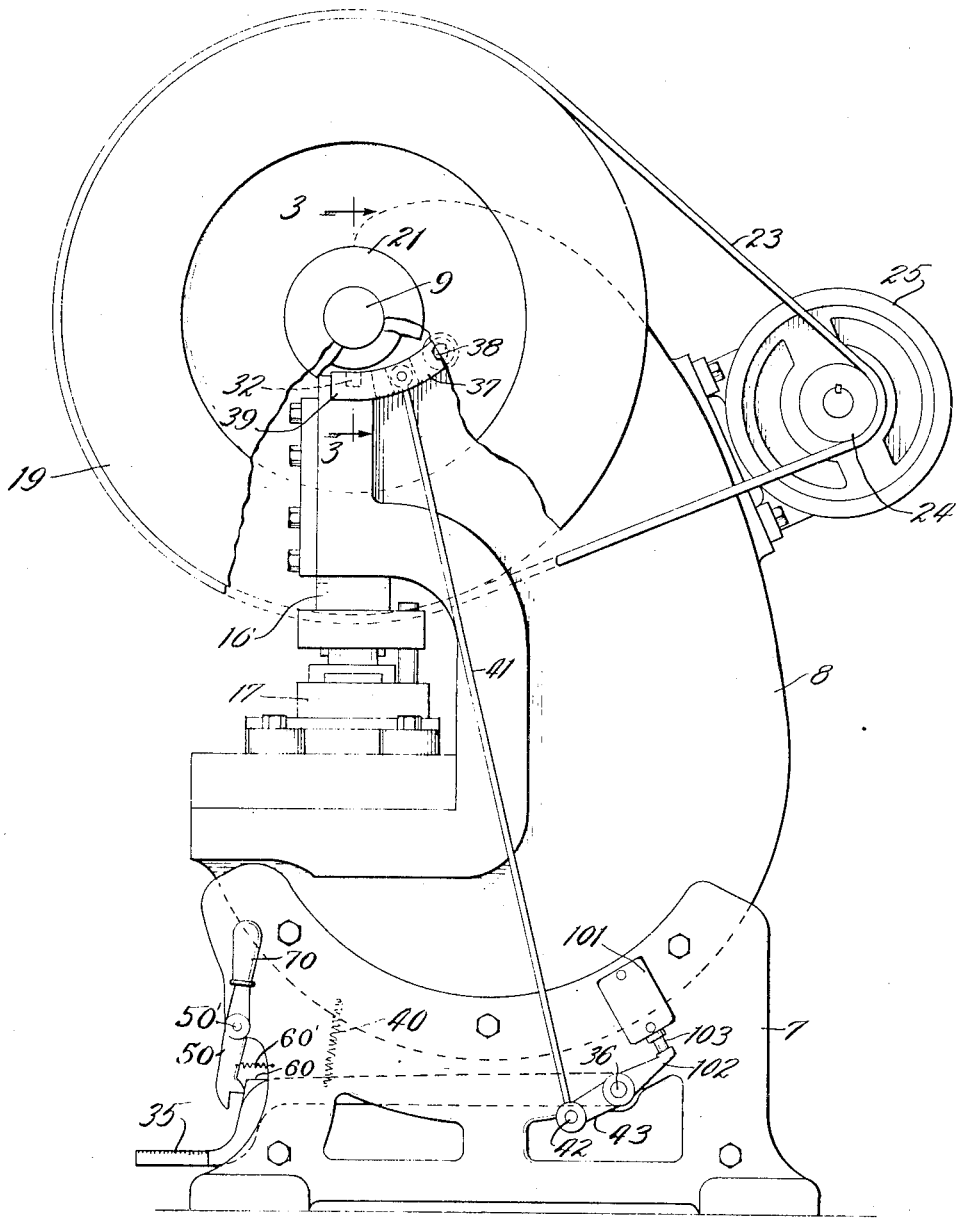

April 3, 1934.   J. A. HOLLANDER   1,953,230
SPEED CONTROL MEANS FOR METAL FORMING MACHINES AND THE LIKE
Filed Aug. 24, 1931   4 Sheets-Sheet 3
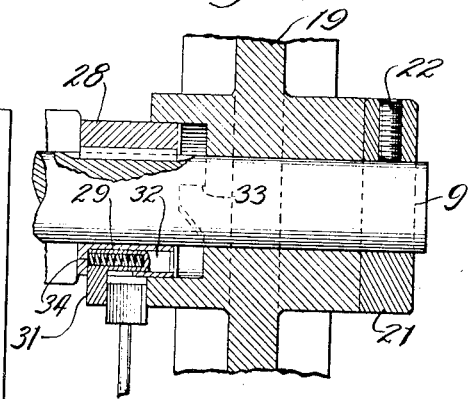
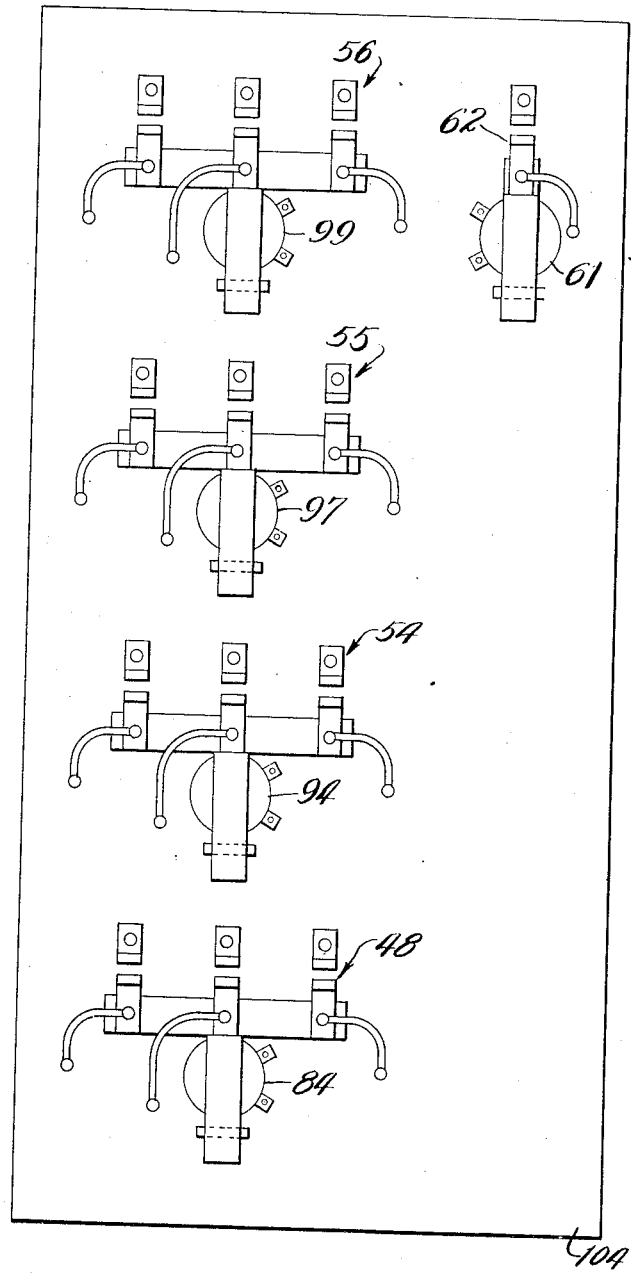
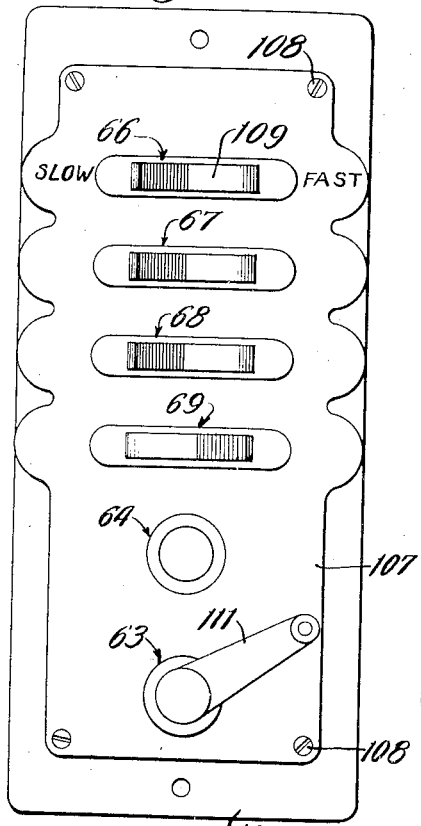
Inventor:
Jacob A. Hollander,
By Carl S. Lloyd
Atty.

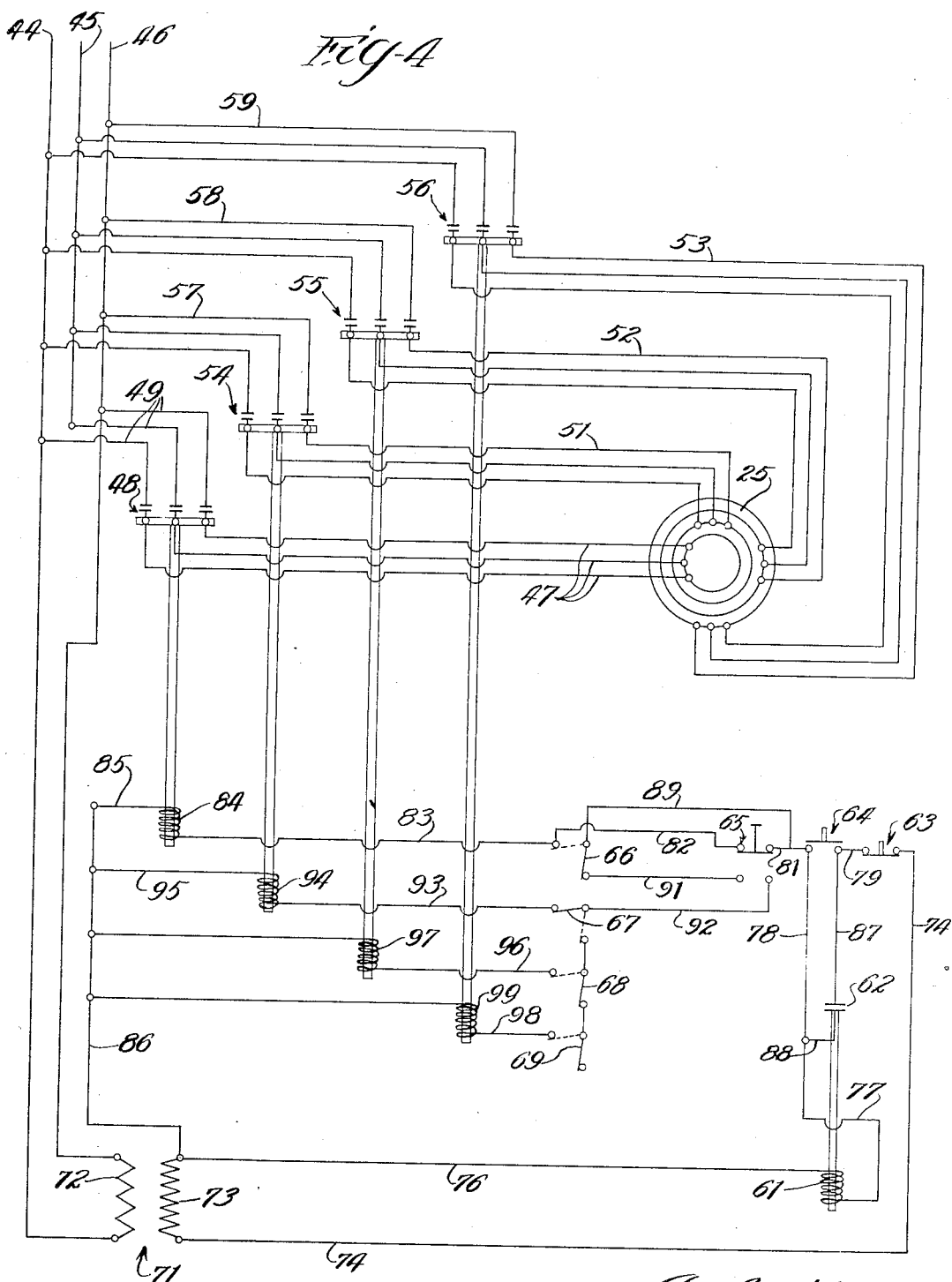

Patented Apr. 3, 1934

1,953,230

UNITED STATES PATENT OFFICE 1,953,230

SPEED CONTROL MEANS FOR METAL FORMING MACHINES AND THE LIKE

Jacob A. Hollander, Forest Park, Ill., assignor to Allan J. Cline, Chicago, Ill.

Application August 24, 1931, Serial No. 559,045

15 Claims. (Cl. 172—239)

This invention relates to improved means for controlling the operation of machines, such as punch-presses, helve hammers, and other metal working machines wherein the moving parts are too massive to permit the machine to be started at high rates of speed.

An automatic punch-press may be considered as a typical example of machines of the class referred to, and to which the invention is applicable. In a punch-press the flywheel is massive and is continuously rotated by a comparatively small motor, the weight of the rotating flywheel supplying the necessary energy for the punching operation when the clutch is engaged. A single revolution or pin type of clutch is employed for connecting the flywheel with the crank-shaft. In this type of clutch the pin is thrown to operative position by spring means and is held in inoperative position by a plunger or equivalent means, the latter being withdrawn by a foot-treadle to allow the clutch to disengage itself. A clutch of this type cannot be successfully operated at a speed much in excess of 200 R. P. M. since the shock of engagement is so severe as to fracture its component parts. In fact the usual speed at which the press may be operated rarely exceeds 100 to 125 R. P. M.

One of the important objects of the present invention is to provide means for increasing the output of machines of this class by providing control means which permits the clutch to be engaged at relatively low speed, and which then operates to automatically bring the machine to an operative or running speed which is greatly in excess of the speed at which the clutch could be safely engaged.

Another object of the invention is to provide a control means of the character referred to which operates to provide dynamic braking for the machine when the clutch is disengaged at a high operating speed.

Further objects and advantages of the invention will be apparent from the following detailed description, taken in connection with the accompanying drawings, wherein I have shown a preferred embodiment thereof.

Referring to the drawings:

Fig. 2 is a side elevational view of the press, a portion of the flywheel being broken away to more clearly illustrate the clutch mechanism;

Fig. 3 is a detailed longitudinal section through the clutch taken on line 3—3 of Fig. 2;

Fig. 4 is a wiring diagram of the power supply and speed control circuits;

Fig. 5 is a front view of a control panel on which are mounted the devices for effecting automatic control of the drive-motor; and Fig. 6 is an enlarged front view of the switch-box which is employed for operating the control circuits.

Figure 1:
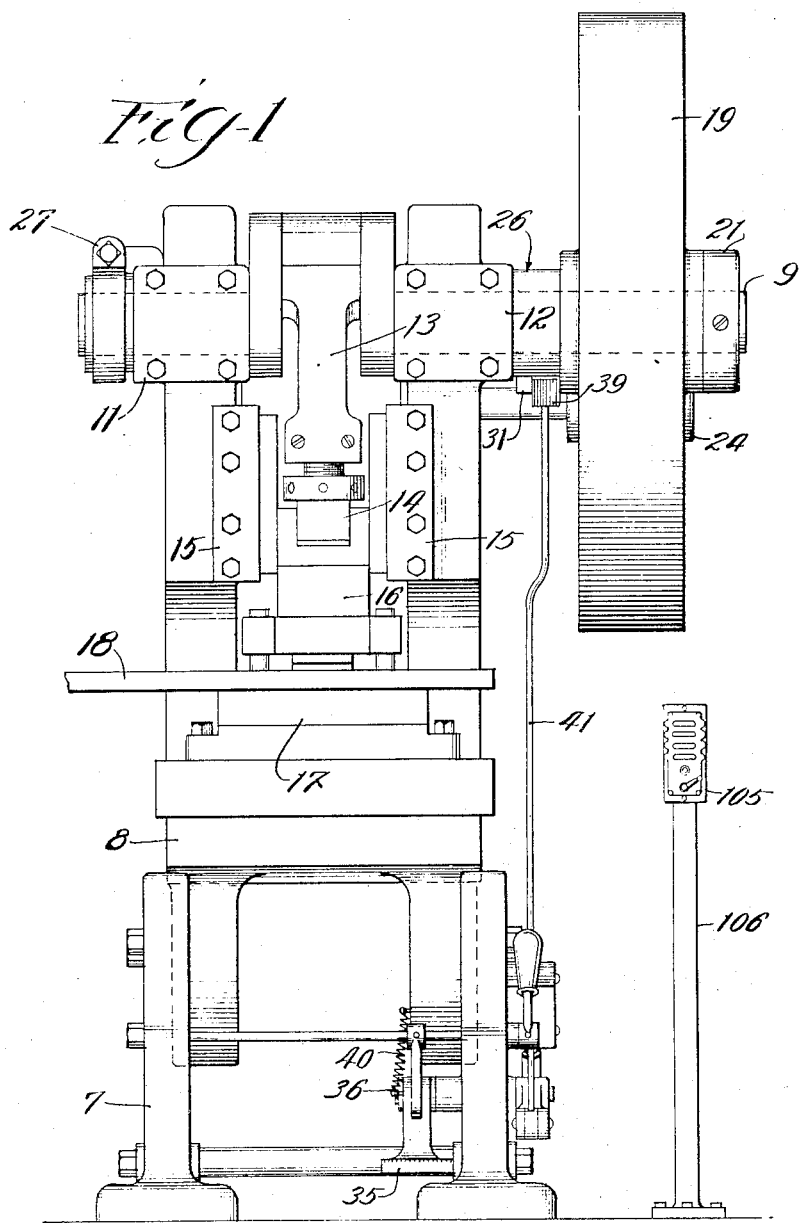
Fig. 1 is a front elevational view of an automatic punch-press to which the speed control means is applied.

The invention will be described as applied to an automatic punch-press. It will be apparent, however, that the invention is not limited to a machine of this particular type, but may be applied to practically any type of machine which requires the use of a pin type or other positive connection clutch and whose producing capacity is limited by the presence of mechanism which is too massive to readily start at high speeds.

Briefly, the invention, as applied to a punch-press, consists in providing a multiple-speed drive-motor having operative connection with the press flywheel, and having its control circuits so arranged as to give a low operating speed, for example, 75 R. P. M., and one or more comparatively high speeds, for example, 300 R. P. M., or greater. The clutch mechanism is arranged to engage the flywheel at the low speed, after which the motor is automatically brought to high speed by control means which is actuated from the clutch throw-in device. When the clutch is disengaged at the high speed the motor is automatically brought back to slow speed, the speed reduction being effected by the transfer back to the slow speed winding of the motor which operation provides dynamic braking for the flywheel.

Considering first the general views of the press shown in Figs. 1 and 2, the numeral 7 designates a base, which affords a support for the press frame, the latter being designated generally by the numeral 8, a crank-shaft 9, mounted for free rotation in bearings 11 and 12, carries a pitman 13 to the lower end of which is secured a die-head 14, the latter having vertical reciprocatory movement between guides 15 which are secured to the frame. A die 16 is supported on a bed 17 in fixed and definite relation to the die-head 14. The stock is fed to die 17 by means of a chute 18.

A flywheel 19 is mounted for free rotation on crank-shaft 9, being held thereon by an end collar 21, which is secured to said shaft by a set screw 22. The flywheel is driven by a belt 23 which takes over a pulley 24 carried on the armature-shaft of a drive-motor 25. Clutch 26, which will presently be described in detail, affords an operative connection between crank-shaft 9 and flywheel 19. A brake 27 is provided on the free end of crank-shaft 9 to prevent over-travel, thereby insuring that the pitman is always brought to rest in the up position. It is the usual practice to provide a brake which comes on automatically when the clutch is moved to disengaging position. The means for accomplishing this is well known and is not shown in the drawings since it forms no part of the present invention. The general construction of the press will not be further described, inasmuch as machines of this general type are well known in the art.

Clutch 26, which connects the crank-shaft with the flywheel, is shown in Figs. 2 and 3. It consists of a heavy collar 28, which is rigid on crank-shaft 9 and which is recessed to receive a clutch-pin 29. Clutch-pin 29 is L-shaped, having a depending or projecting portion 31, and a horizontal portion 32 which is positioned to engage against any one of a series of shouldered projections 33, which are formed in the hub of flywheel 19. A coil-spring 34, positioned in a tubular recess formed in pin 29, and bearing against the adjacent wall portion of collar 28 tends to urge said pin to the right, viewing Fig. 3, into driving engagement with projections 33.

Continuing the reference to Figs. 2 and 3, clutch-pin 29 is operated from a foot-treadle 35, which is rigidly secured to a stub-shaft 36, the latter extending through and being rotatably supported in an upright frame portion of base 7. A cam piece 37, pivotally secured at 38 to the frame, is provided near its free end with a bevelled surface 39, which engages the depending portion 31 of clutch-pin 29 to draw the latter clear of the projections 33. It will be evident that when cam piece 37 is in the raised position shown in Figs. 1–3, it will hold the clutch-pin in the disconnected position. This is the normal or inoperative position of the parts, the flywheel 19 being thus disconnected from crank-shaft 9 and free to run at idling speed.

Means which is operated from foot-treadle 35 is provided for lowering cam piece 37 to throw clutch-pin 29 into locking engagement with the hub of flywheel 19. This mechanism consists of a rod 41 having pivotal connection at its upper end with cam piece 37, and having its lower end pivotally connected at 42 to an arm 43, which is rigid on stub-shaft 36. When pressure is applied to foot-treadle 35, shaft 36 is turned in a counter clock-wise direction, viewing Fig. 2, and rod 41 is lowered to move cam piece 37 from its position of engagement with clutch-pin 29. A coil spring 40 extending between foot-treadle 35 and frame 8 normally holds rod 41 and cam piece 37 in raised position to prevent engagement of the clutch.

A latch 50 is or may be provided to hold the treadle 35 in the down position, this latch being pivoted to the frame at 50' and being drawn toward a shoulder 60 on the treadle by means of a spring 60' to cause it to engage said treadle when the latter is depressed. Said latch may be disengaged by means of a handle 70 and makes it possible to operate the machine automatically for such period of time as may be desired.

Both flywheel 19 and crank-shaft 9, and its connected parts, are necessarily of heavy construction and as a result of this a tremendous shearing force is imparted to clutch-pin 29 when it is thrown into operative engagement with the flywheel. For this reason it is not practical to operate a machine requiring the use of a clutch of this type at a speed much in excess of 200 R. P. M. Speeds greater than this would soon ruin the clutch by reason of the tremendous shearing stress imparted to the clutch-pin.

This difficulty is avoided according to my invention, by employing a multi-speed motor for driving the flywheel at a comparatively low speed while the flywheel is disconnected from the crank-shaft and which is automatically stepped up to a high rate of speed immediately upon the throwing-in of the clutch-pin. The control of motor 25 in this manner can be best understood by reference to Fig. 4. In this figure the motor 25, which is of the squirrel cage type, is provided with windings which give it four different ranges of speed. Power to the separate windings may be supplied from a 440 volt 3-phase line, the leads of which are indicated by numerals 44, 45, 46. The low speed winding is supplied from the main line through wires 47 and a magnetic contactor 48, the movable contacts of which connect with wires 47 and the stationary contacts of which connect with wires 49 which lead to the power supply line. In a similar manner the windings for the second, third and fourth ranges of speed are connected to the main line through wires 51, 52 and 53, respectively, and magnetic contactors 54, 55 and 56, respectively, the latter in turn connecting, respectively, to the main power supply line through wires 57, 58 and 59. Motor 25 is thus connected to be driven at any one of four different rates of speed depending upon which of the magnetic contactors is closed.

Continuing the reference to Fig. 4, the control circuit for regulating contactors 48, 54, 55 and 56 comprises: a relay, the coil of which is indicated at 61, the contacts being indicated at 62; a stop-switch 63; a run-switch 64; a trip-switch 65; and a series of 3-way switches 66, 67, 68 and 69.

The control circuit, in the embodiment shown, operates on a single-phase 220 volt source of power, a transformer 71 being provided in the supply circuit with its primary 72 connecting with leads 44 and 46 of the 440 volt main power supply line. The secondary 73 of transformer 71 is connected through wire 74 to one terminal of stop-switch 63, the other terminal of the secondary 73 connecting through wire 76 to coil 61 of the relay and thence connecting through wires 77 and 78 to one terminal of run-switch 64. Stop-switch 63 is normally closed and trip-switch 65, which is operated from the clutch control means in a manner presently to be explained, is normally in the position shown in Fig. 4 with its armature connecting the line across its upper pair of terminals. With switches 63, 65, 66 and 67 in the position shown in Fig. 4, it will be apparent that upon closing run-switch 64 current will be led from wire 74 through switch 63 to a wire 79, thence through switch 64 to a wire 81 which feeds one of the upper terminals of trip-switch 65. From switch 65 current passes through a wire 82 to the upper terminal of 3-way switch 66, this terminal in turn being connected through a wire 83 to the coil 84 of magnetic contactor 48, the return from this coil to the opposite side of the line being through wires 85 and 86. Closing run-switch 64 thus energizes coil 84 of magnetic contactor 48, closing the latter to energize the slow speed winding of motor 25. Momentary closing of run-switch 64 also energizes coil 61 of the relay, which immediately closes its contacts 62. The effect of this is to short-circuit run-switch 64 through wires 87, 88 and 78. The relay thus provides a holding-circuit for shorting the run-switch after the latter has been momentarily closed.

To step up the speed of motor 25 to the second stage, assuming switches 63, 65, 66, and 67 are in the positions shown in Fig. 4, it is merely necessary to close trip-switch 65 across its lower pair of terminals. Under these conditions current passes from wire 81 through a wire 89 to switch 66 and thence through a wire 91 to the lower terminals of trip-switch 65. Since switch 65 is now closed, the current then flows through the lower terminals thereof and a wire 92 to the common terminal of switch 67, and thence through a wire 93 to coil 94 of magnetic contactor 54. The circuit is completed from coil 94 through a wire 95 to return wire 86. The actuation of magnetic contactor 54 supplies current to the second speed coil winding of motor 25, so that the motor now runs at its second speed range. No current flows to the motor through its slow speed coil winding at this time, inasmuch as the upper terminals of trip-switch 65 have been opened so that no current can flow through wire 83 and coil 84.

In order to bring the motor to its third and fourth ranges of speed it is merely necessary to adjust switches 67, 68 and 69, it being apparent for example, that with switch 67 thrown to the down position, and with switch 68 thrown to the up position, current would be supplied through wire 96 to coil 97 of magnetic contactor 55, this contactor being the one which controls the current supply to the third speed winding of the motor. In a similar manner, with switches 67 and 68 both in the down position, and switch 69 in the up position, current would be supplied through wire 98 to the coil 99 of magnetic contactor 56, which controls the fourth speed winding of the motor. It may be added that by throwing switch 66 to the up position the motor may be operated as a regular slow speed or single speed motor, trip-switch 65 being then shorted through wire 89 so the current will be supplied directly to coil 84. With switch 66 in this position trip-switch 65 has no effect whatever on the speed of the motor.

The trip-switch 65 is arranged to be operated whenever the foot-treadle 35 is depressed to throw in clutch-pin 29. To this end the switch is mounted, as shown in Fig. 2, in a switch-box 101, which is positioned on base 7 adjacent an arm 102, the latter constituting an integral extension of arm 43. A plunger 103 projecting through the switch box, and operatively connected with the switch arm, engages the end of arm 102. With the foot-treadle in the inactive, or raised, position arm 102 engages plunger 103 and holds the latter in such position that the switch arm closes the pair of terminals corresponding to the upper terminals of Fig. 4. When the treadle is depressed to throw in the clutch, arm 102 actuates plunger 103 to shift the switch arm into engagement with the terminals corresponding to the lower pair shown in Fig. 4. Therefore, each time the foot-treadle is operated to throw in the clutch, trip-switch 65 is operated to step the motor to one of its higher ranges of speed, the particular speed depending upon the position of switches 67, 68 and 69. The operation is therefore very simple. It is merely necessary for the operator to first close run-switch 64 to bring the motor to its slow running speed and then depress foot-treadle 35, which automatically throws in the clutch and which at the same time actuates trip-switch 65 to immediately bring the motor to one of its higher ranges of speed. Since the clutch is thrown in at comparatively low speed, it is not subject to dangerously high shearing stresses.

When the clutch is disengaged, trip-switch 65 is returned by arm 102 to reconnect the power supply to the slow speed winding. This transfer of the current supply from one of the high speed windings back to the slow speed winding, automatically gives dynamic braking on the flywheel. It is a characteristics of squirrel cage motors to operate at synchronous speed, and hence the slow speed winding, when reconnected by trip-switch 65, forcibly decelerates the flywheel. It has been found that the motor when connected with the flywheel actually drops from full speed of about 1800 R. P. M. to half speed in about one and one-half seconds. A powerful but shockless brake is thus provided for returning the flywheel to slow speed upon disengagement of the clutch.

In Fig. 5 is shown a control panel 104 upon which are mounted magnetic contactors 48, 54, 55 and 56, and also the holding relay consisting of the coil 61 and contacts 62. This panel may be mounted at any convenient point and may consist of an individual unit as shown, or may be a part of a larger control panel having numerous similar units for controlling a group of presses or similar machines.

In Figs. 1 and 6 is shown a switch-box 105, which is mounted near the press on a pedestal support 106. This box may be of the usual sheet-metal construction and includes a face-plate 107, which is removably secured to the box by screws 108. The 3-way switches 66, 67, 68 and 69 are mounted in the upper portion of the box and are provided with any preferred form of operating means. Those shown are provided with switch-arms 109, which project through openings in face-plate 107 and which when positioned to the left give the slow speed and when positioned to the right give the fast speed. The run-switch 64 is preferably a button type switch, as it is intended to be only momentarily closed after which it is shorted by the holding relay. The stop-switch 63, which is normally closed, is positioned at the bottom of the switch-box, and is provided with a pivoted safety latch arm 111 which engages over and holds the switch in the normal open position to prevent accidental starting of the motor while setting dies or otherwise making the machine ready for operation. Since the switch-box is located at a convenient point adjacent the machine, as shown in Fig. 1, the operator may quickly make the necessary settings of the switches to give the desired speed range for any particular class of work.

The foregoing detailed description has been given for clearness of understanding only and no unnecessary limitations should be understood therefrom, but the appended claims should be construed as broadly as permissible in view of the prior art.

What I regard as new and desire to secure by Letters Patent is:

1. In a punch press or the like, the combination of: an operating shaft; a die-head or the like operated thereby; a flywheel; a positive-connection clutch affording a driving connection between said shaft and the flywheel; means for engaging and disengaging the clutch with the flywheel; and variable speed drive means for turning the flywheel at slow idling speed, the clutch being disengaged, and further operative to automatically accelerate the speed of the flywheel immediately upon engagement of the clutch therewith.

2. In a punch press or the like, the combination of: an operating shaft; a die-head or the like operated thereby; a flywheel; a positive-connection clutch affording a driving connection between said shaft and the flywheel; means for engaging and disengaging the clutch with the flywheel; and variable speed drive means for turning the flywheel at slow idling speed, the clutch being disengaged, and further operative to automatically accelerate the speed of the flywheel immediately upon engagement of the clutch therewith, said drive means being also operative to rapidly decelerate the flywheel to slow idling speed immediately upon disengagement of the clutch.

3. In a punch press or the like, the combination of: an operating shaft; a die-head or the like operated thereby; a flywheel; a positive-connection clutch affording a driving connection between said shaft and the flywheel; means for engaging and disengaging the clutch with the flywheel; a variable speed motor for driving the flywheel; and control means for the motor including a slow-speed starting circuit for operating the motor at slow idling speed, and a high-speed circuit having switch means therein operative to automatically accelerate the motor immediately upon engagement of the clutch with the flywheel.

4. In a punch press or the like, the combination of: an operating shaft; a die-head or the like operated thereby; a flywheel; a positive-connection clutch affording a driving connection between said shaft and the flywheel; means for engaging and disengaging the clutch with the flywheel; a variable speed motor for driving the flywheel; and control means for the motor including a slow-speed starting circuit for operating the motor at slow idling speed, and a high-speed circuit having switch means therein operative to automatically accelerate the motor immediately upon engagement of the clutch with the flywheel, said switch means being further operative to decelerate the motor to slow idling speed immediately upon disengagement of the clutch.

5. In a punch press or the like, the combination of: an operating shaft; a die-head or the like operated thereby; a flywheel; a positive-connection clutch affording a driving connection between said shaft and the flywheel; means for engaging and disengaging the clutch with the flywheel; a multiple-speed motor for driving the flywheel at a plurality of speeds, said motor having a slow-speed winding for driving the flywheel at slow idling speed and a second winding for driving the flywheel at a relatively high running speed; and a control circuit for the motor including a starting switch for energizing the slow-speed winding, and additional switch means for automatically transferring the power supply from the slow to the high-speed winding immediately upon engagement of the clutch with the flywheel.

6. In a punch press or the like, the combination of: an operating shaft; a die-head or the like operated thereby; a flywheel; a positive connection clutch affording a driving connection between said shaft and the flywheel; means for engaging and disengaging the clutch with the flywheel; a multiple-speed motor for driving the flywheel at a plurality of speeds, said motor having a slow-speed winding for driving the flywheel at slow idling speed and a second winding for driving the flywheel at a relatively high running speed; and a control circuit for the motor including a starting switch for energizing the slow-speed winding, and additional switch means for automatically transferring the power supply from the slow to the high-speed winding immediately upon engagement of the clutch with the flywheel, said last mentioned switch means being further operative to de-energize the high-speed winding and re-energize the slow-speed winding upon disengagement of the clutch, thereby providing dynamic braking for the flywheel.

7. In a punch press or the like, the combination of; an operating shaft; a die-head or the like operated thereby; a flywheel; a positive-connection clutch affording a driving connection between said shaft and the flywheel; means for engaging and disengaging the clutch with the flywheel; a multiple-speed motor for driving the flywheel at a variety of speeds, said motor having a slow-speed winding for driving the flywheel at slow idling speed and a second winding for driving the flywheel at a relatively high running speed; and a control circuit for the motor including a starting switch for energizing the slow-speed winding, and additional switch means adapted to be actuated by said clutch actuating means to automatically transfer the power supply from the slow to the high-speed winding immediately upon engagement of the clutch with the flywheel.

8. In a punch press or the like, the combination of; an operating shaft; a die-head or the like operated thereby; a flywheel; a positive-connection clutch affording a driving connection between said shaft and the flywheel; means for engaging and disengaging the clutch with the flywheel; a multiple-speed motor for driving the flywheel at a variety of speeds, said motor having a slow-speed winding for driving the flywheel at slow idling speed and a second winding for driving the flywheel at a relatively high running speed; and a control circuit for the motor including a starting switch for energizing the slow-speed winding, and additional switch means adapted to be actuated by said clutch actuating means to automatically transfer the power supply from the slow to the high-speed winding immediately upon engagement of the clutch with the flywheel, said last mentioned switch means being further operative to de-energize the high-speed winding and re-energize the slow-speed winding upon disengagement of the clutch, thereby providing dynamic braking for the flywheel.

9. Speed control means for an automatic punch-press or the like comprising: a press shaft, a die-head operated thereby; a flywheel; a positive-connection clutch for connecting said flywheel to said shaft; a multiple-speed drive motor having a winding for driving said flywheel at a slow idling speed, and a second winding for driving the flywheel at a relatively high running speed; and a control circuit for the motor having means therein operative to automatically transfer the power from the slow to the high-speed winding when the clutch is thrown into operative engagement with the flywheel.

10. Speed control means for an automatic punch-press or the like having a fly-wheel and a positive-connection clutch for controlling the same comprising: a multiple-speed drive motor having a winding for driving the flywheel of the press at a slow idling speed, and a second winding for driving the flywheel at a relatively high running speed; and a control circuit for the motor having means therein operative to automatically transfer the power from the slow to the high-speed winding when the clutch is thrown into operative engagement with the flywheel, said means being further operative to de-energize the high-speed winding and re-energize the slow-speed winding upon disengagement of the clutch, thereby providing dynamic braking for the flywheel.

11. In a punch press or the like, the combination of: an operating shaft; a die-head or the like operated thereby; a flywheel; a positive-connection clutch affording a driving connection between said shaft and the flywheel; means for engaging and disengaging the clutch with the flywheel; a multiple-speed motor for driving the flywheel at a variety of speeds including a winding for driving the flywheel at a slow idling speed and a second winding for driving the flywheel at a relatively high running speed; and control means for the motor comprising contactors for connecting said windings to a source of power supply, a starting circuit including electromagnetic means for actuating the slow-speed contactor, a run circuit including electro-magnetic means for actuating the high-speed contactor, a manually operable switch for closing the starting circuit, and additional switch means for automatically opening the starting circuit and closing the run circuit upon engagement of the clutch with the flywheel.

12. In a punch press or the like, the combination of: an operating shaft; a die-head or the like operated thereby; a flywheel; a positive-connection clutch affording a driving connection between said shaft and the flywheel; means for engaging and disengaging the clutch with the flywheel; a multiple-speed motor for driving the flywheel at a variety of speeds including a winding for driving the flywheel at a slow idling speed and a second winding for driving the flywheel at a relatively high running speed; and control means for the motor comprising contactors for connecting said windings to a source of power supply, a starting circuit including electro-magnetic means for actuating the slow-speed contactor, a run circuit including electro-magnetic means for actuating the high-speed contactor, a manually operable switch for closing the starting circuit, and additional switch means for automatically opening the starting circuit and closing the run circuit upon engagement of the clutch with the flywheel, said last mentioned switch means being further operative to open the run circuit and close the starting circuit upon disengagement of the clutch, thereby providing dynamic braking for the flywheel.

13. In a punch press or the like, the combination of: an operating shaft; a die-head or the like operated thereby; a flywheel; a positive-connection clutch affording a driving connection between said shaft and the flywheel; means for engaging and disengaging the clutch with the flywheel; electrically operated means for driving the flywheel including a slow-speed starting circuit and a high-speed run circuit; a trip-switch adapted to be actuated by said clutch operating means to automatically open the starting circuit and close the run circuit upon engagement of the clutch with the flywheel.

14. In a punch press or the like, the combination of: a shaft; a die-head or the like operated thereby; a flywheel; a positive-connection coupling means between said shaft and said flywheel; a multiple-speed power source connected to said flywheel, and means connected to said coupling means for controlling the speed of said power source.

15. In a punch press or the like, the combination of: a shaft; a die-head or the like operated thereby; a flywheel; a positive-connection coupling means between said shaft and said flywheel; a multiple-speed power source connected to said flywheel; and means interposed between said power source and said coupling means whereby said power source is caused to alter its speed upon operation of said coupling means.

JACOB A. HOLLANDER.